US00RE36610E

United States Patent [19]

Okumura et al.

[11] E Patent Number: Re. 36,610

[45] Reissued Date of Patent: Mar. 14, 2000

[54] EVACUATION APPARATUS AND EVACUATION METHOD

[75] Inventors: Katsuya Okumura, Poughkeepsie, N.Y.; Fumio Kuriyama, Boulder, Colo.; Yukio Murai, Fujisawa, Japan; Manabu Tsujimura, Yokohama, Japan; Hiroshi Sobukawa, Fujisawa, Japan

[73] Assignees: Kabushiki Kaisha Toshiba, Kawasaki; Ebara Corporation, Tokyo, both of Japan

[21] Appl. No.: 08/883,957

[22] Filed: Jun. 27, 1997

Related U.S. Patent Documents

Reissue of:

[64] Patent No.: 5,062,271
Issued: Nov. 5, 1991
Appl. No.: 07/519,377
Filed: May 4, 1990

U.S. Applications:

[63] Continuation of application No. 08/145,593, Nov. 4, 1993, abandoned.

[30] Foreign Application Priority Data

May 9, 1989 [JP] Japan ..... 1-114166

[51] Int. Cl.[7] ..... B01D 8/00

[52] U.S. Cl. ..... 62/55.5; 55/282.5; 415/90; 417/901

[58] Field of Search ..... 62/55.5; 55/282.5; 415/90; 417/901

[56] References Cited

U.S. PATENT DOCUMENTS

| | | | |
|---|---|---|---|
| 3,188,819 | 6/1965 | Hogan . | |
| 3,536,418 | 10/1970 | Breaux | 417/49 |
| 3,625,019 | 12/1971 | Osterstrom | 62/55.5 |

(List continued on next page.)

FOREIGN PATENT DOCUMENTS

| | | |
|---|---|---|
| 250613 | 7/1988 | European Pat. Off. . |
| 332107 | 9/1989 | European Pat. Off. . |
| 397051B1 | 11/1990 | European Pat. Off. . |
| 3512614 | 10/1986 | Germany . |
| 57-212395 | 12/1982 | Japan . |
| 59-90784 | 5/1984 | Japan . |
| 62-168994 | 7/1987 | Japan . |
| 63-43415 | 2/1988 | Japan . |
| 63-182525 | 11/1988 | Japan . |
| 5-15979 | 1/1993 | Japan . |
| 709819 | 6/1954 | United Kingdom . |
| 2065782 | 7/1981 | United Kingdom . |

OTHER PUBLICATIONS

Patent Abstracts of Japan, No. 62074075, Sep. 4, 1987.
O'Hanlon, John F., "A User's Guide to Vacuum Technology", copyright 1980 by John Wiley & Sons, Inc.
Heppel, T.A., "High Vacuum Pumping Systems—an Overview," *Vacuum,* vol. 37, nos. 8/9, pp. 593–601 (1987).

(List continued on next page.)

*Primary Examiner*—Ronald Capossela
*Attorney, Agent, or Firm*—Finnegan, Henderson, Farabow, Garrett & Dunner, L.L.P.

[57] ABSTRACT

An evacuation apparatus and method using a turbomolecular pump having a rotor provided with a plurality of rotor blades and a spacer provided with a plurality of stator blades so that gas molecules are sucked in from a suction port, compressed and discharged from an exhaust port of the turbomolecular pump is disclosed. A heat exchanger is provided at the suction port side of the turbomolecular pump to freeze-trap gas molecules from being cooled by a helium refrigerator.

The gate valve is disposed upstream of the heat exchanger and is provided in a suction pipe which extends between the vacuum vessel and the turbomolecular pump. In exhausting the vacuum vessel, the gate valve is opened and, in this state, the turbomolecular pump and the helium refrigerator are run. During regeneration, the gate valve is closed, the turbomolecular pump is run, and the heat exchanger is heated by means of a heater or by operation of the helium refrigator being suspended, thereby sublimating molecules freeze-trapped in the heat exchanger.

30 Claims, 5 Drawing Sheets .

U.S. PATENT DOCUMENTS

| | | | |
|---|---|---|---|
| 3,768,273 | 10/1973 | Missimer . | |
| 4,176,526 | 12/1979 | Missimer . | |
| 4,277,951 | 7/1981 | Longsworth | 62/55.5 |
| 4,408,469 | 10/1983 | Forth | 62/55.5 |
| 4,438,632 | 3/1984 | Lessard et al. . | |
| 4,535,597 | 8/1985 | Missimer et al. . | |
| 4,597,267 | 7/1986 | Forrest | 62/55.5 |
| 4,608,866 | 9/1986 | Bergquist | 62/55.5 |
| 4,614,093 | 9/1986 | Bächler et al. . | |
| 4,679,401 | 7/1987 | Lessard et al. . | |
| 4,679,402 | 7/1987 | Andeen . | |
| 4,757,689 | 7/1988 | Bächler et al. . | |
| 4,860,546 | 8/1989 | Harvell et al. | 62/55.5 |
| 4,926,648 | 5/1990 | Okumura et al. | 62/55.5 |

OTHER PUBLICATIONS

Missimer, Dale J., "Cryo Trends Fast—Cycle Pump Forecast: Cold & Dry," *Photonics Spectra,* Feb. 1984.

Missimer, Dale J., Polycold Systems, Inc., "Improving Summer Pumpdowns in Vacuum Coating Systems," Presented at the Society of Vacuum Coaters 22nd Annual Technical Conference, New Orleans, Mar. 29, 1979.

Application Manual, "Polycold' Vacuum Cold Trap Chillers," Mar. 1983.

Missimer, Dale J., Polycold Systems, Inc., "New Water Vapor Cryopump For Ultra Fast Pumpdowns," 1985.

Polycold Systems, Inc., "Which Polycold® Cryogenerator to Use?" 1987.

Power et al. at the third Israeli Vacuum Conference in Sep. 1973

"Replace Liquid Nitrogen in High Vacuum Systems for Use With Baffles & Cryocoil", Polycold, Cryocoolers (May 1984).

"AP–8S Cryopump–Setting New Standards for Operational Reliability" Air Products.

Shigi, T. et al., "Effects of Cooled Baffle in Evacuation Characteristics of Turbo–Molecular Pump," Cryogenics, vol. 30, Sep. Supplement, pp. 523–526 (1990).

Polycold Systems Inc., "Cryocoolers, Cryopumps and Vacuum Cold Trap Chillers" (Dec. 1983).

Polycold Systems Inc., "Polycold® Cryorefrigerator and Baffle Systems, Models P75–4CB and P100–6CB," (Jun. 1982).

Polycold Systems, Inc., Product Specifications, Mar. 1990.

Yokokura, Kenji et al., "Bakeable Cryopump for JFT2," 20th Joint Symposium of Vacuum Commemorating the 25th Anniversary of the Vacuum Society of Japan, 1979.

*Journal of Vacuum Science and technology:* "Diffstaks with integral cold traps," (abstract), vol. 15, No. 2, Mar.–Apr. 1978.

Osterstrom, G.E. and Shapiro, A.H., "Improved Turbomolecular Pump," *Journal of Vacuum Science and Technology,* vol. 9, No. 1, Jan.–Feb. 1972.

Yokokura, Kenji et al., Improvements in the JFT–2 Vacuum System, Japan Atomic Energy Research Institute Memo (Jul. 1980).

21
22
22
23
24
25
26
27
28
29
30
31
32

EVACUATION APPARATUS AND EVACUATION METHOD

Matter enclosed in heavy brackets [ ] appears in the original patent but forms no part of this reissue specification; matter printed in italics indicates the additions made by reissue.

*This application is a continuation of application Ser. No. 08/145,593, filed Nov. 4, 1993, now abandoned, which is a reissue application of U.S. Pat. No. 5,062,271, issued Nov. 5, 1991 (U.S. Ser. No. 07/519,377, filed May 4, 1990).*

BACKGROUND OF THE INVENTION

1. Field of the Invention

The present invention relates to an evacuation apparatus for creating a vacuum and also to an evacuation method which is carried out by operating an evacuation apparatus.

2. Description of the Prior Art

A typical conventional turbomolecular pump will first be explained with reference to FIG. 5.

A conventional turbomolecular pump, which is generally denoted by reference numeral 1, includes a motor 2, a motor shaft 3 for transmitting the rotational force that is derived from the motor 2, a rotor 4 which is secured to the motor shaft 3, a plurality of rotor blades 5 which are fixed to the rotor 4, a plurality of stator blades 6 each disposed between a pair of adjacent rotor blades 5, a spacer 7 having the stator blades 6 attached thereto, a casing 10 which is provided with a suction port 8 and an exhaust port 9, and a protective net 11 for protecting the rotor and stator blades 5 and 6. In operation, the motor 2 is driven to rotate the rotor blades 5 at high speed in an atomosphere that has sufficient vacuum present for a molecular flow to be available, thereby sucking gas molecules from the suction port 8, compressing the gas at a high compression ratio and moving the gas toward the exhaust port 9, and thus producing a high vacuum.

The above-described conventional turbomolecular pump suffers, however, from the following problems. Namely, the gas exhausting performance of the pump depends on the molecular weight of the gas that is removed thereby. When a gas having a low molecular weight is required to be removed, the gas exhausting performance is considerably lowered. The lower the compression ratio, the lower the gas exhausting performance. The blade speed ratio C as a parameter representing the compression ratio is expressed as follows:

$$C=V/Vm$$

(wherein V is the peripheral speed of the rotor blades and Vm is the maximum probability speed of gas molecules).

The maximum probability speed Vm of gas molecules is expressed as follows:

$$Vm=\sqrt{(2KT/M)}$$

(wherein M is the molecular weight of the gas, K is Boltzmann's constant, and T is the absolute temperature of the gas).

As will be clear from these expressions, the lower the molecular weight M of the gas, the higher the maximum probability speed Vm of the gas molecules and the lower the blade speed ratio C. Therefore, when a gas having a low molecular weight is required to be removed, the gas exhausting performance is low. When the gas exhausting performance is low, many problems are likely to occur in the actual operation of the turbomolecular pump.

Among the problems associated with gases having low molecular weights, the existence of water vapor, in particular, adversely affects the gas exhausting performance of the pump. In a system wherein a part of the system that is provided with a turbomolecular pump is open to the atmosphere and air flows into the system, the greater part of the residual gas under a vacuum of about $10^{-4}$ Torr to $10^{-10}$ Torr ($10^{-4}$ mmHg to $10^{-10}$ mmHg) which is produced by the turbomolecular pump is water vapor. The residual water vapor has adverse effects on the degree of vacuum attained and the vacuum environment.

In a case employing a cryo-vacuum pump that employs a helium refrigerator and a heat exchanger which provides ultra-low temperatures of from about 15° K. to about 20° K., the gas exhausting characteristics with regard to water vapor are improved and it is therefore possible to a certain extent to overcome the above-described problems. However, such a cryo-vacuum pump involves the following problems:

(1) Since a refrigerator for ultra-low temperatures is used, it takes a long time to start and suspend the refrigerator.

(2) Since the pump is a capture type pump, i.e. it freezes and traps most gas molecules, it must be regenerated for a long period every time a predetermined load running is completed.

(3) Since the sublimation temperature differs depending upon the kind of gas molecules, various kinds of gas molecules are separated from each other and successively discharged from the pump at high concentrations as the temperature of the heat exchanger rises during a regenerative operation, and it is difficult to treat various kinds of gases which are discharged separately. In particular, in semiconductor manufacturing processes, toxic, highly-corrosive, explosive and combustible gases, for example, monosilane ($SiH_4$), hydrogen fluoride (HF), etc., are used that are diluted with inert gases such as nitrogen ($N_2$), helium (He), etc., and it is therefore extremely difficult to cope with the separate discharge of these various kinds of gas.

SUMMARY OF THE INVENTION

In view of the above-described disadvantages of the prior art, it is an object of the present invention to provide an evacuation apparatus which is capable of effectively exhausting gases having low molecular weights, particularly water vapor, and which can be easily regenerated as well as being capable of operating on a continuous basis.

It is another object of the present invention to provide a method which enables effecting such effective exhausting and regenerating operations.

To these end, according to one of its aspects, the present invention provides an evacuation apparatus comprising: a turbomolecular pump having a rotor provided with a plurality of rotor blades and a spacer provided with a plurality of stator blades so that gas molecules are sucked in from a suction port, compressed and discharged from an exhaust port: a heat exchanger provided at the suction port side of the turbomolecular pump to freeze-trap gas molecules by being cooled by a helium refrigerator; and a gate valve provided on the upstream side of the heat exchanger.

According to another of its aspects, the present invention provides an evacuation method for a vacuum vessel which has a heat exchanger that is disposed between the vacuum vessel and a suction port of a turbomolecular pump to freeze-trap gas molecules by being cooled by a helium refrigerator and a gate valve that is disposed upstream of the heat exchanger and is provided in a suction pipe which extends between the vacuum vessel and the suction port of the turbomolecular pump, the method comprising: an exhaust step in which the gate valve is opened and, in which the turbomolecular pump and the helium refrigerator are run; and a regeneration step in which, with the gate valve closed, the turbomolecular pump is run, and the heat exchanger is heated with a heater or operation of the helium refrigerator is suspended, thereby sublimating molecules freeze-trapped in the heat exchanger.

According to the evacuation apparatus of the present invention, when an evacuation operation is to be conducted, the gate valve that is provided at the upstream side of the suction port is opened and the surface of the heat exchanger is cooled by the helium refrigerator, thereby enabling evacuation to be effectively carried out by a combination of the evacuation that is effected by the freeze-trapping of gas molecules and the evacuation that is performed by the turbomolecular pump.

If evacuation is carried out by means of the turbomolecular pump only, the residual gas in the vacuum vessel contains a large amount of gases having low molecular weights. In particular, when the system is repeatedly evacuated and opened to the atmosphere, the greater part of the residual gas after the evacuation is water molecules. Accordingly, by freeze-trapping water molecules by means of the heat exchanger that is disposed at the suction port side of the turbomolecular pump, the gas exhausting performance of the pump is improved and it is therefore possible to produce a high vacuum of good quality. A gas having a low molecular weight which is not freeze-trapped, for example, hydrogen, helium, etc., is also cooled by the heat exchanger and therefore the gas temperature is lowered, which results in a reduction in the speed of the gas molecules. Accordingly, the blade speed ratio C increases and the gas exhausting performance of the turbomolecular pump is improved. Thus, it is possible to eliminate the problems associated with the conventional turbomolecular pump, that is, the inferior performance for exhausting gases having low molecular weights, particularly water vapor.

After the gas exhausting operation has been conducted for a predetermined period of time, it is necessary to carry out a regenerative operation in which water vapor which has been freeze-trapped in the heat exchanger is sublimated and thereby released. Such a regenerative operation can be effected by reducing the pressure around the heat exchanger to a level lower than the saturated vapor pressure of the freeze-trapped molecules, with the gate valve being closed. In this regenerative operation, operation of the helium refrigerator is suspended so as to allow the temperature of the heat exchanger to rise. Alternatively, a heater may be employed to raise the temperature of the heat exchanger. Since the turbomolecular pump is continuously run even during the regenerative operation, the regeneration can be positively effected.

Unlike the evacuation that is performed by a cryo-vacuum pump alone, the evacuation process in the present invention is carried out by means of a helium refrigerator in combination with a turbomolecular pump and an exhaust operation can therefore be continuously performed for a considerably long period of time. In addition, it is possible to effect regeneration within a short period of time, as stated above.

This regenerative operation can be conducted by the use of the gate valve cut-off time during normal operation of a turbomolecular pump in, for example, a semiconductor manufacturing process, and this makes it possible to run the evacuation apparatus on a continuous basis without requiring a specific time for regeneration.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements and, of which.

DETAILED DESCRIPTION OF THE PREFERRED EMBODIMENTS

One embodiment of the present invention will be described below with reference to the accompanying drawings. However, the present invention is in no way restricted by this embodiment.

One embodiment of the present invention will be described below with reference to FIGS. 1 and 2.

Figure 1:
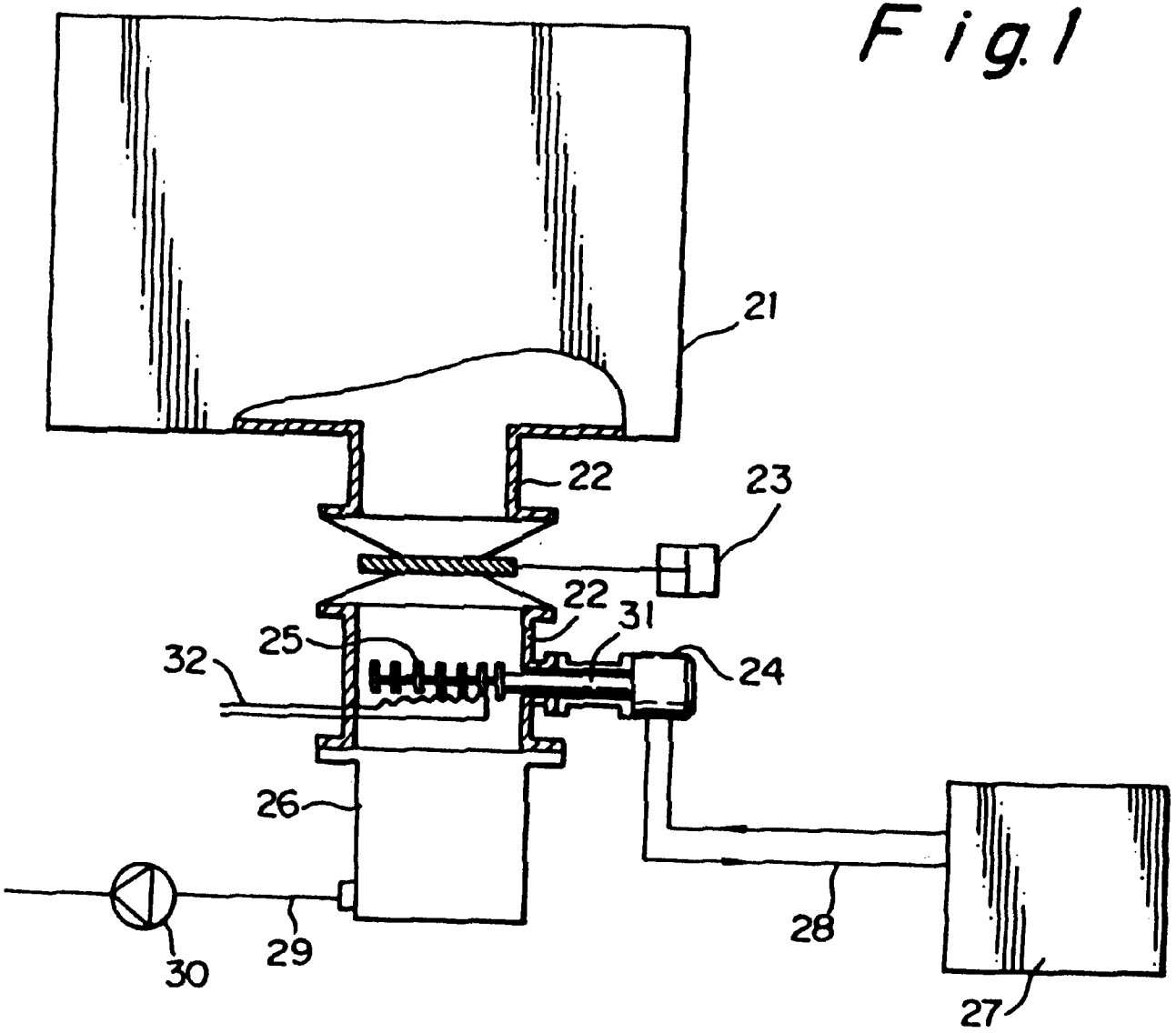
FIG. 1 is a schematic sectional view showing an evacuation apparatus according to one embodiment of the present invention.
Figure 2:
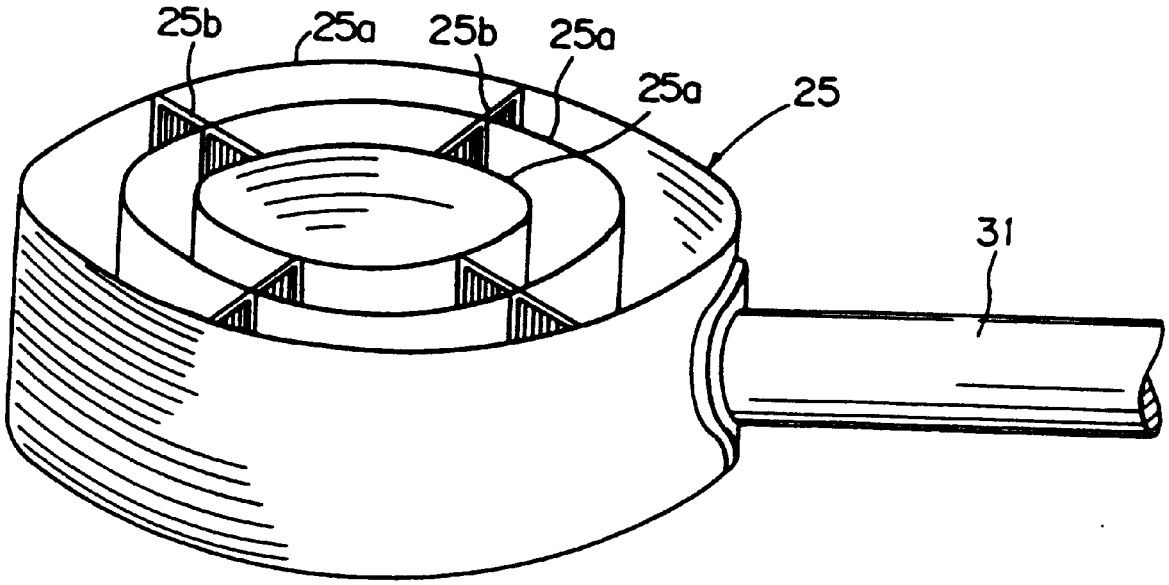
FIG. 2 is an enlarged perspective view of a heat exchanger.

FIG. 1 shows a vacuum vessel 21 and an evacuation apparatus for evacuating it. A suction pipe 22 extends between the vacuum vessel 21 and a suction port of a turbomolecular pump 26. A heat exchanger 25 is provided in the suction pipe 22 on the suction port side of a turbomolecular pump 26. The surface of the heat exchanger 25 that is in contact with a cold head 31 of a single-stage, GM (Gifford-McMahon) cycle helium refrigerator 24 may be cooled to a temperature of −100° C. to −200° C. A gate valve 23 is disposed upstream of the heat exchanger 25 within the suction pipe 22. A roughing pump 30 is connected through an exhaust pipe 29 to the exhaust port side of the turbomolecular pump 26. A compressor unit 27 circulatorily supplies compressed helium gas to the helium refrigerator 24 through a helium gas pipe 28.

The helium refrigerator 24 is not two-stage, GM cycle helium refrigerator, as employed in an ordinary cryo-vacuum pump, but a small-sized, single-stage, GM cycle helium refrigerator. The reason for this is to cool the heat exchanger to a temperature of −100° C. to −200° C. for the purpose of selectively freeze-trapping water molecules, which cannot be efficiently exhausted by the turbomolecular pump.

Since the heat exchanger 25 constitutes an exhaust resistance to the turbomolecular pump 26, the configuration of the heat exchanger 25 must be designed by taking into consideration the flow of gas molecules which are to be freeze-trapped. FIG. 2 shows in detail one example of the heat exchanger.

The heat exchanger 25 comprises a plurality of cylindrical heat transfer members 25a concentrically disposed and connected to each other by means of a plurality of radial heat transfer plates 25b. These heat transfer members 25a and the heat transfer plates 25b are disposed parallel to the flows of gas molecules sucked in from said suction port minimizing the flow resistance.

Figure 3A:
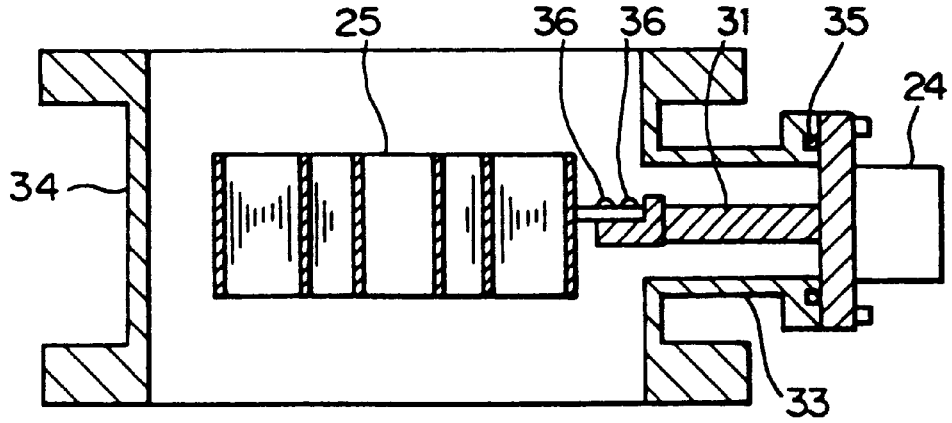
FIGS. 3(a) and (b) are enlarged sectional view of an attachment construction of a heat exchanger and a helium refrigerator.
Figure 3B:
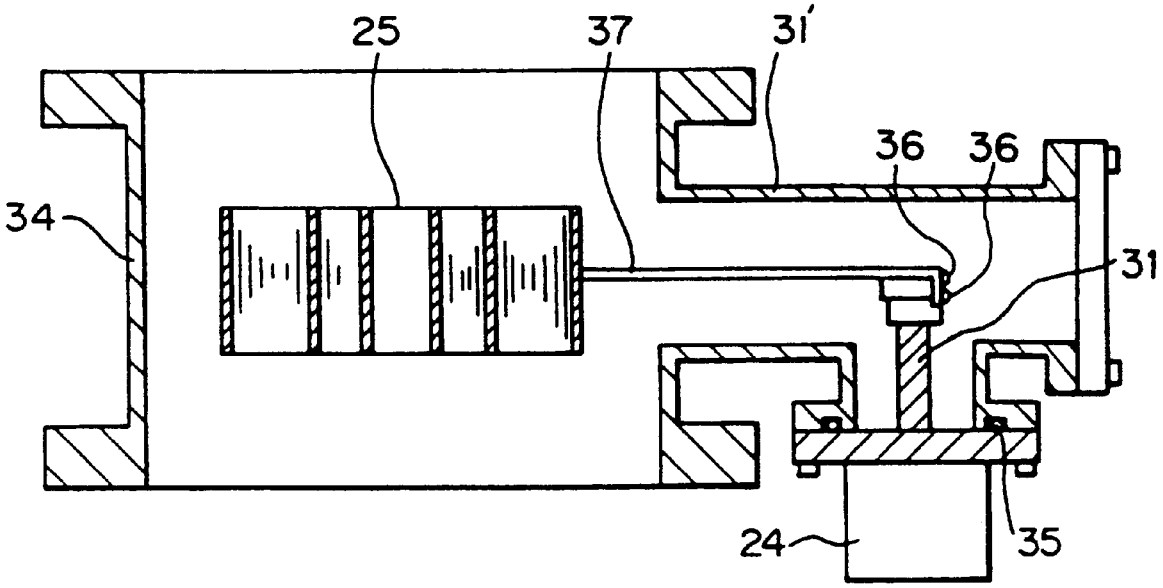

FIGS. 3(a) and 3(b) show an attachment construction of the heat exchanger 25 and the helium refrigerator 24. In FIG. 3(a), the helium refrigerator 24 is horizontally disposed and is attached to a flange 33 of the suction pipe casing 34 through a gasket 35. The distal end of the cold head 31 of the helium refrigerator 24 which is horizontally disposed is fastened to the heat exchanger 25 by means of screws 36. In FIG. 3(b), the helium refrigerator 24 is vertically disposed and is attached to the casing 34 through an L-shaped flange 31'. The cold head 31 which is vertically disposed is attached to the heat exchanger 25 through a relatively long heat transfer plate 37.

The operation of the evacuation apparatus shown in FIG. 1 will next be explained. To carry out the exhaust operation, the gate valve 23 is opened and the compressor unit 27 is run to supply compressed helium gas to the helium refrigerator 24. In addition, the turbomolecular pump 26 is operated to suck in a gas through the suction pipe 22. In consequence, water vapor contained in the gas is freeze-trapped by the heat exchanger 25. As a result, the gas exhausting efficiency increases, and it is possible to obtain a high vacuum of good quality.

The surface temperature of the above-described heat exchanger 25 needs to be set by taking into account the degree of vacuum in the exhaust system and the constituents of a gas which is to be exhausted. For example, the surface temperature of the heat exchanger 25 for freeze-trapping water molecules must be set at −90° C. or lower when the pressure inside the vacuum vessel 21 is $10^{-4}$ Torr, and at −130° C. or lower when the vacuum vessel pressure is $10^{-8}$ Torr. However, the surface temperature also depends on the configuration of the exhaust pipe system of the apparatus and the exhaust speed. This is due to the relationship between the surface temperature of the heat exchanger and the saturated vapor pressure of water molecules. The relationship therebetween is shown by a graph in FIG. 4, which shows a saturated vapor pressure curve of water vapor, with the temperature (°C.) plotted along the axis of abscissas and the saturated vapor pressure (Torr) along the axis of ordinates.

Incidentally, gas molecules (hydrogen, helium, etc.) having low molecular weights, exclusive of water vapor, are not freeze-trapped, but the gas temperature is lowered through collision or contact of these gas molecules with the heat exchanger 25, so that the blade speed ratio increases and thus the gas exhausting performance is improved.

Next, to regenerate the heat exchanger having gas molecules freeze-trapped therein, the gate valve 23 is closed to check the inflow of gas molecules from the vacuum vessel 21, and in this state, the pressure in the suction pipe 22 is lowered by the evacuating action of the turbomolecular pump 26, thereby enabling the freeze-trapped molecules to be sublimated, (i.e., regeneration) on the basis of the relationship between the pressure inside the suction pipe and the saturated vapor pressure.

Figure 4:
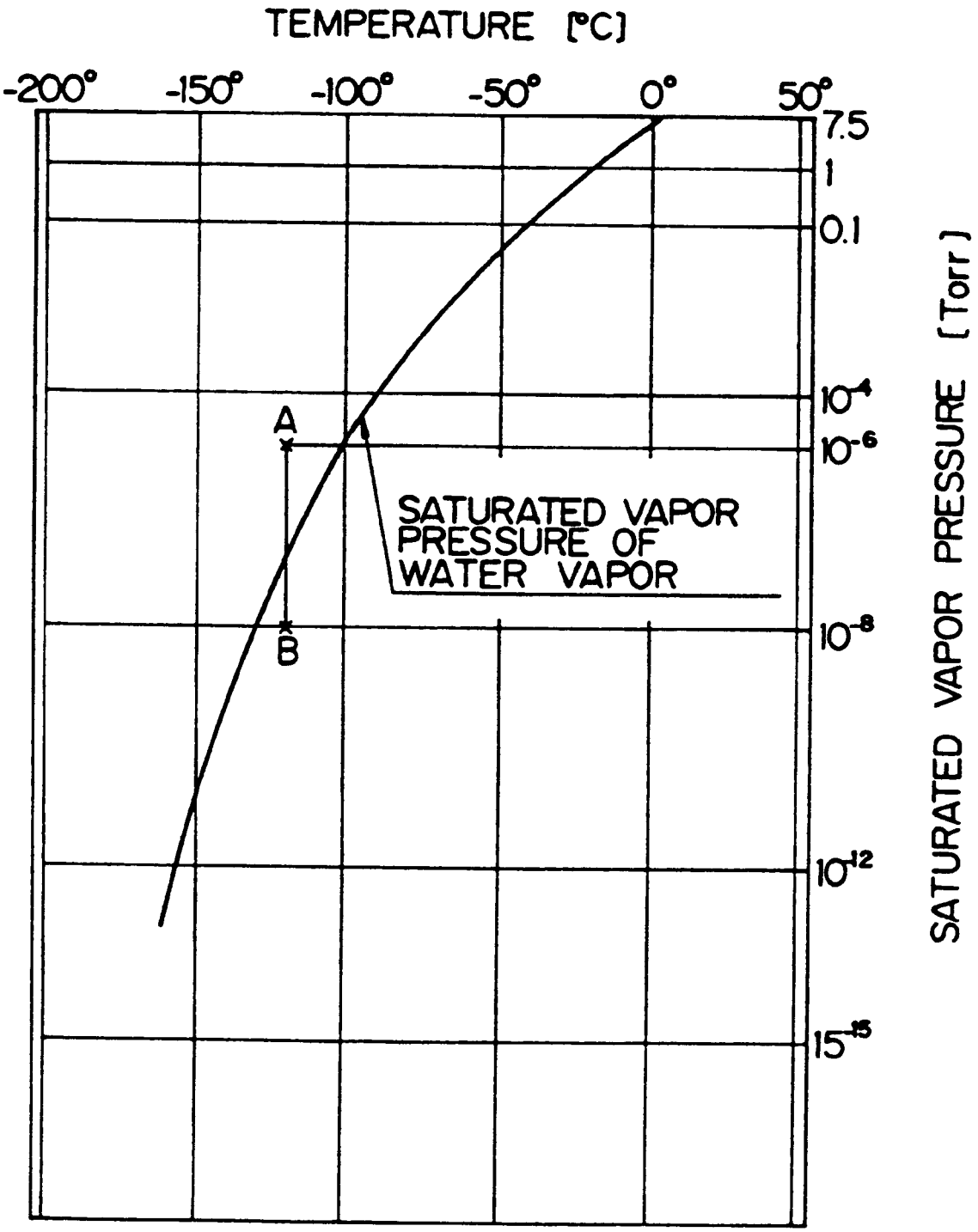
FIG. 4 is a graph showing the relationship between the temperature and the saturated vapor pressure.
Figure 5:
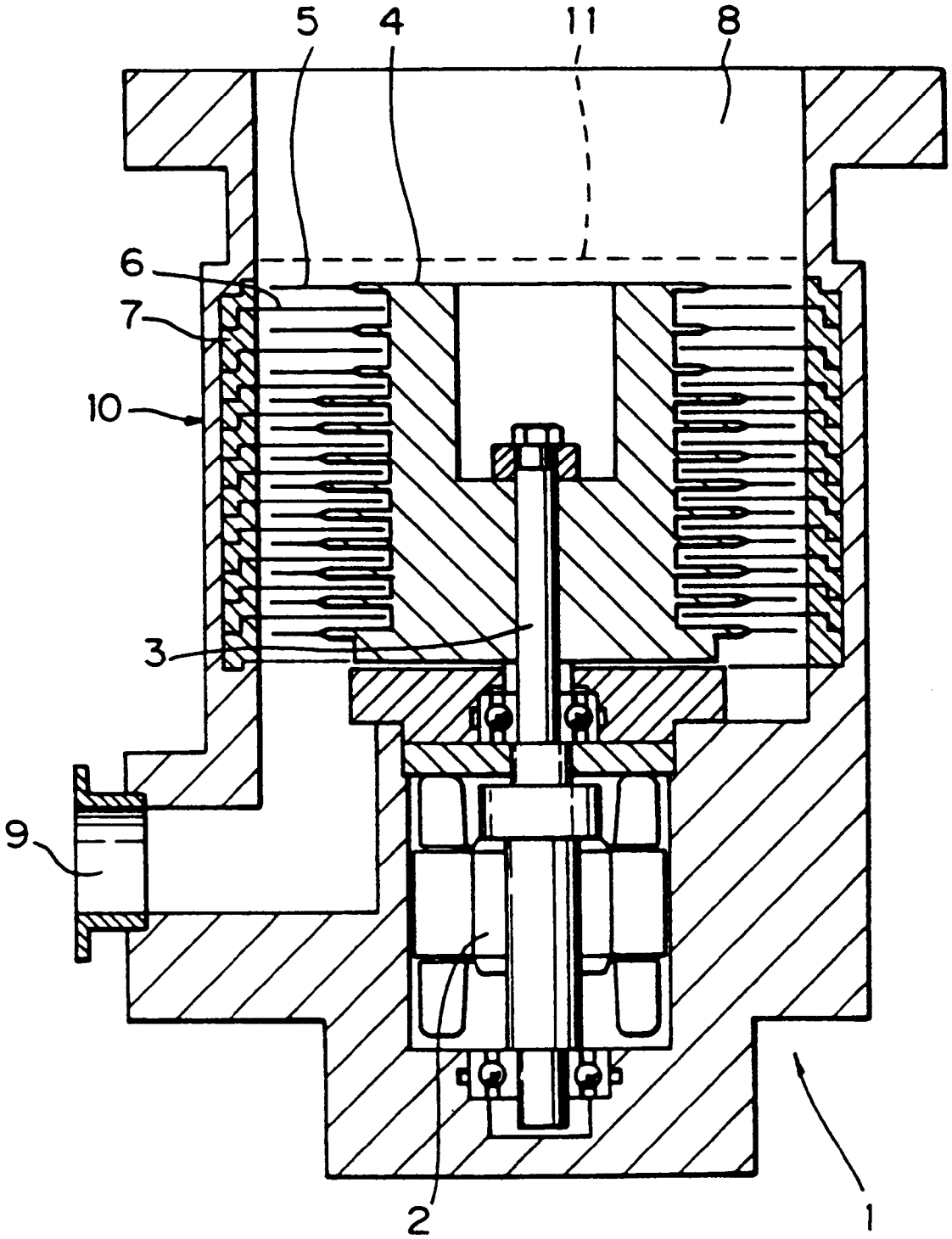
Fig.5 PRIOR ART
FIG. 5 is a sectional view of a conventional turbomolecular pump.

For example, suppose the temperature in the suction pipe 22 is −120° C. and the water vapor pressure in the suction pipe before closing the gate valve 23 is $6\times10^{-6}$ Torr (point A in FIG. 4). In this state, if the gate valve 23 is closed and the exhaust operation is continued, the water vapor pressure in the suction pipe 22 would be reduced to about $1\times10^{-8}$ Torr (point B in FIG. 4). Thus, the water vapor freeze-trapped on the heat exchanger 25 is sublimated and discharged by the action of turbomolecular pump 26 to provide a regenerative operation.

Such a regenerative operation does not require the refrigerator 24 to be switched over between the refrigerating mode and the defrost mode, as is required in the conventional turbomolecular pump. Thus, it is possible to operate the turbomolecular pump on a continuous basis. Actually, the regeneration is performed by suspending the helium refrigerator 24 so as to allow the heat exchanger 25 to rise in temperature, or alternatively by raising the temperature of the heat exchanger 25 by means of the heater 32. It is also possible to perform the regeneration by suspending the turbomolecular pump 26 and operating the heater 32, with the roughing pump 30 alone being run.

By these arrangements of the invention, the following advantageous effects could be obtained.

(1) The exhaust speed is increased.

(2) The exhaust speed of gases having low molecular weights, particularly water molecules, is substantially increased.

(3) The exhaust operation can be continuously performed for a long period of time.

(4) The time required for regeneration is short.

(5) The configuration and heating area of the heat exchanger can be selected on the basis of the constituents of a gas which is to be exhausted and the exhaust time.

What is claimed is:

1. An evacuation apparatus operatively connectable to a vacuum vessel to be evacuated, said apparatus comprising:

a turbomolecular pump having a rotor provided with a plurality of rotor blades and a spacer provided with a plurality of stator blades, said turbomolecular pump operating so that gas molecules are sucked in from a suction port, compressed and discharged from an exhaust port;

a heat exchanger operatively connected to said suction port of said turbomolecular pump for freeze-trapping gas molecules in said heat exchanger;

a helium refrigerator connected to said heat exchanger for cooling said heat exchanger to a temperature of −100° C.;

a gate valve operatively connected at an upstream side of said heat exchanger for controlling inflow of the gas molecules from said vacuum vessel into said heat exchanger.

2. An evacuation apparatus claimed in claim 1, wherein the suction port of said turbomolecular pump is connected to the vacuum vessel to be evacuated through a suction pipe, and said heat exchanger is located in said suction pipe.

3. An evacuation apparatus claimed in claim 2, wherein said gate valve is disposed in said suction pipe on the upper stream side of said heat exchanger.

4. An evacuation apparatus claimed in claim 3, wherein said helium refrigerator is horizontally or vertically supported on a housing of said suction pipe, and said heat exchanger is connected to a distal end of a cold head of said helium refrigerator.

5. An evacuation apparatus claimed in any one of claims 1 to 4, wherein said heat exchanger comprises a plurality of cylindrical heat transfer members concentrically disposed and connected to each other by a plurality of radial heat transfer plates, said heat transfer members and heat transfer plates being disposed parallel to a flow of the gas molecules sucked in by said turbomolecular pump.

6. An evacuation apparatus claimed in any one of claims 1 to 4, wherein said helium refrigerator is a single-stage GM cycle helium refrigerator.

7. An evacuation method for a vacuum vessel which has a heat exchanger that is disposed between said vacuum vessel and a suction port of a turbomolecular pump to freeze-trap gas molecules by being cooled by a helium refrigerator connected to said heat exchanger, and a gate valve that is disposed upstream of said heat exchanger and provided in a suction pipe which extends between said vacuum vessel and said suction port of said turbomolecular pump, said method comprising:

exhausting said vacuum vessel by opening said gate valve, and operating said turbomolecular pump and said helium refrigerator; and regenerating said heat exchanger by closing said gate valve, and heating said heat exchanger through the use of a heater or the suspension of operation of said helium refrigerator such that gas molecules freeze-trapped in said heat exchanger are sublimated.

8. An evacuation method claimed in claim 7, wherein during said regenerating, said turbomolecular pump is not operated and a roughing pump provided on an exhaust port side of said turbomolecular pump is operated.

*9. An evacuation apparatus operatively connectable to a vacuum vessel to be evacuated, said apparatus comprising:*

*a turbomolecular pump having a rotor provided with a plurality of rotor blades and a spacer provided with a plurality of stator blades, said turbomolecular pump operating so that gas molecules are sucked in from a suction port, compressed and discharged from an exhaust port;*

*a heat exchanger operatively connected to said suction port of said turbomolecular pump for freeze-trapping gas molecules thereon;*

*a helium refrigerator connected to said heat exchanger for cooling said heat exchanger to a temperature of −100° C. to −200° C.;*

*a gate valve operatively connected at an upstream side of said heat exchanger for controlling inflow of the gas molecules from said vacuum vessel into said heat exchanger.*

*10. An evacuation apparatus claimed in claim 9, wherein the suction port of said turbomolecular pump is connected to the vacuum vessel to be evacuated through a suction pipe, and said heat exchanger is located in said suction pipe.*

*11. An evacuation apparatus claimed in claim 10, wherein said gate valve is disposed in said suction pipe on the upper stream side of said heat exchanger.*

*12. An evacuation apparatus claimed in claim 11, wherein said helium refrigerator is horizontally or vertically supported on a housing of said suction pipe, and said heat exchanger is connected to a distal end of a cold head of said helium refrigerator.*

*13. An evacuation apparatus claimed in any one of claims 9 to 12, wherein said heat exchanger comprises a plurality of cylindrical heat transfer members concentrically disposed and connected to each other by a plurality of radial heat transfer plates, said heat transfer members and heat transfer plates being disposed parallel to a flow of the gas molecules sucked in by said turbomolecular pump.*

*14. An evacuation apparatus claimed in any one of claims 9 to 12, wherein said helium refrigerator is a single-stage GM cycle helium refrigerator.*

*15. An evacuation apparatus claimed in claim 9, wherein said heat exchanger is disposed so as to minimize flow resistance to the gas molecules.*

*16. An evacuation apparatus claimed in claim 9, wherein said heat exchanger includes a substantially cylindrical heat transfer member.*

*17. An evacuation apparatus claimed in claim 9, wherein substantially all heat exchange surfaces of said heat exchanger are substantially parallel to the flow of gas molecules.*

*18. An evacuation apparatus claimed in claim 9 further including a suction pipe directly coupled to said suction port of said turbomolecular pump, said heat exchanger mounted within said suction pipe.*

*19. An evacuation apparatus claimed in claim 9 further including a suction pipe within which is mounted said heat exchanger, said suction pipe being axially aligned with said turbomolecular pump.*

*20. An evacuation apparatus claimed in claim 9, wherein said refrigerator includes a cold head in thermal contact with said heat exchanger.*

*21. An evacuation apparatus claimed in claim 9 further including a heater for heating said heat exchanger.*

*22. An evacuation apparatus claimed in any one of claims 15 to 21, wherein said helium refrigerator is a single-stage GM cycle helium refrigerator.*

*23. A trap for use in an evacuation apparatus, the evacuation apparatus including a vacuum vessel and a turbomolecular pump, the trap provided between the vacuum vessel and the turbomolecular pump, the trap comprising:*

*a heat exchanger for freeze-trapping gas molecules; and*

*a helium refrigerator thermally connected to the heat exchanger for cooling said heat exchanger to a temperature of −100° C. to −200° C.*

*24. A trap for freeze-trapping gas molecules in an evacuation apparatus, the trap comprising:*

*a single-stage helium refrigerator; and*

*a heat exchanger all surfaces of which being exposed for freeze-trapping gas molecules, said heat exchanger thermally connected to said refrigerator to cool said surfaces to −100° C. to −200° C.*

*25. A trap for freeze-trapping gas molecules, comprising:*

*a single-stage helium refrigerator; and*

*a heat exchanger including a cold surface for freeze-trapping gas molecules, said cold surface being disposed to substantially minimize flow resistance to gas molecules, said heat exchanger thermally connected to said refrigerator to cool said cold surface to −100° C. to −200° C.*

*26. A trap of claim 25, wherein*

*said cold surface is for selectively freeze-trapping water molecules and is aligned parallel to the direction of gas flow.*

*27. A method for freeze-trapping gas molecules in a process for evacuating a vacuum vessel, the method comprising:*

*contacting a heat exchanger with gas molecules wherein all surfaces of said heat exchanger are exposed for freeze-trapping gas molecules; and*

*cooling the heat exchanger to a temperature of −100° C. to −200° C. using a helium refrigerator so as to freeze-trap gas molecules.*

*28. A method for freeze-trapping gas molecules in a process for evacuating a vacuum vessel,*

*the method comprising:*

*contacting a heat exchanger with gas molecules, said heat exchanger disposed so as to substantially minimize flow resistance to gas molecules; and*

*cooling the heat exchanger to a temperature of −100° C. to −200° C. using a helium refrigerator so as to freeze-trap gas molecules.*

*29. An evacuation apparatus comprising:*

*a turbomolecular pump;*

*a heat exchanger operatively connected to a suction port of said turbomolecular pump, all surfaces of said heat exchanger being exposed for freeze-trapping gas molecules; and*

*a helium refrigerator connected to said heat exchanger for cooling said heat exchanger to a temperature of −100° C. to −200° C.*

*30. An evacuation apparatus comprising:*

*a turbomolecular pump;*

*a heat exchanger operatively connected to a suction port of said turbomolecular pump, said heat exchanger disposed to substantially minimize flow resistance to gas molecules; and*

*a helium refrigerator connected to said heat exchanger for cooling said heat exchanger to a temperature of −100° C. to −200° C.*

* * * * *